UNITED STATES PATENT OFFICE.

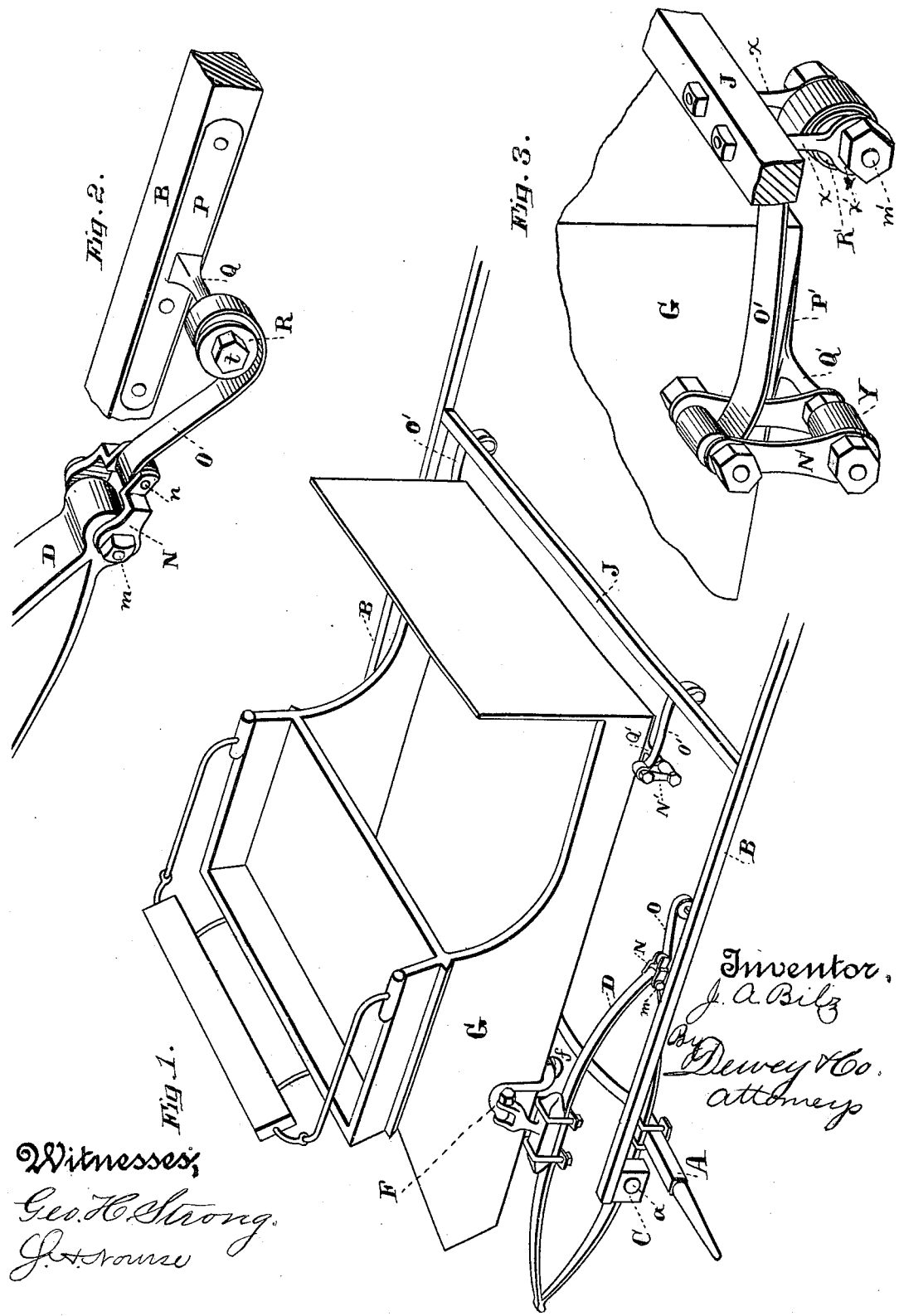

JOHN A. BILZ, OF PLEASANTON, CALIFORNIA.

TWO-WHEELED VEHICLE.

SPECIFICATION forming part of Letters Patent No. 273,804, dated March 13, 1883.

Application filed October 16, 1882. (No model.)

*To all whom it may concern:*

Be it known that I, JOHN A. BILZ, of Pleasanton, county of Alameda, State of California, have invented an Improved Two-Wheeled Vehicle; and I hereby declare the following to be a full, clear, and exact description thereof.

My invention relates to certain new and useful improvements in two-wheeled vehicles.

These improvements consist in certain details of construction and combination of devices, as hereinafter fully described, and specifically pointed out in the claims.

Referring to the accompanying drawings, Figure 1 is a perspective view. Fig. 2 is an enlarged detail of connection between spring and shaft. Fig. 3 is an enlarged detail of connection between body and cross-bar of shafts.

Let A represent the axle, and D the side springs rigidly clipped thereto.

B represents the shafts, extending beside the springs and connected with them. In my former patent, No. 262,273, I describe this connection; but here it will be necessary simply to say that by reason of a box, C, bolted to the shafts, in which a pin, $a$, extending from the springs D is mounted, the shafts have a pivotal connection with said springs, so that their upward-and-downward movement would not affect the springs and axle were there no other connection; but while this would be the result most desired to avoid the jogging motion of the horse, still there must be some further connection to prevent the springs and axle from turning over. In my former patent I show a spring-connection between the forward ends of the springs and the shafts, which, while serving to secure the springs, still provides for the necessary independence of the shafts. Instead of the connection there shown, I have the following: Bolted through the forward ends of the springs by a bolt, $m$, is a coupling or link, N, in the end of which is a cross-bolt, $n$. O is a spring, one end of which is curled or looped around bolt $n$ as a pivot-shaft. To the inside of the shafts is bolted a bar, P, having an inwardly-projecting pin, Q. This pin has a shoulder, $s$, or a collar, near its end, and its end receives a nut, $t$. The forward end of the spring O curls around spirally, and is secured to the pin Q between two face-plates, R, fitted between the side of the spring and the collar and nut on the pin. This connection secures the springs to the shafts, and yet by reason of its pivotal link and its spring all the independence required is given to the shafts without affecting the body.

Upon the top of the springs D is a hinged cross-rod, F, upon which the body G rests, not firmly but loosely, the rod F passing through bearings $f$ under said body. Now, it is obvious that here again some connection with the shafts is needed to prevent the body from turning over and precipitating its occupant; yet I desire to have a yielding connection to provide for a certain degree of independence.

Under the sides of the body, near its front, is bolted a bar, P′, having an outwardly-projecting pin, Q′. Upon this pin, between suitable shoulders and nuts, is pivoted a coupling or link, N′.

O′ is a spring-strip, the end of which is pivoted in the end of the link N′. It extends forward to and under the cross-bar J of the shafts. Through the cross-bar extend bolts $x$, receiving nuts on top, and having eyes $x'$. Extending downward through these eyes passes a bolt, $m'$, upon which, between the eyes and with intervening face-plates, R′, the end of spring O′ is coiled and secured. This connection allows the body all necessary movement. By means of its pivoted link it may conform to any inclination or remain level, and through its spring it will readily yield to counteraction. It will happen on a grade that the spring O′ will bear down upon the pin Q′. To prevent injury I place a rubber band or pad, Y, upon the pin Q′ between the sides of the link. This receives the spring-strip and avoids wear.

It will be seen from the drawings that to the body is given great independence of the shafts. Not only are the springs and axle hinged to the shafts, but the body is hinged to the springs, thus giving to it a freedom which will prevent it from having to follow the shafts in their up-and-down movement, thus making it an easy-riding vehicle.

Having thus described my invention, what I claim as new, and desire to secure by Letters Patent, is—

1. In a two-wheeled vehicle, the axle A and springs D, clipped thereto, in combination with the shafts B, hinged to the springs, and the means for connecting the forward ends of the springs with the shafts, consisting of the coupling or link N, pivoted in the ends of the springs, the pin Q, bolted to the shafts, and the intervening spring-strip, O', pivoted to the link and coiled upon and secured to the pin, substantially as and for the purpose herein described.

2. In a two-wheeled vehicle, the hinged or loosely-journaled body G, in combination with the shafts B, having a cross-bar, J, and the means for connecting the front of the body with the cross-bar, consisting of the pin Q', bolted to the body, the link N', pivoted on said pin, the bolt $m'$, supported under the cross-bar J, and the intervening spring-strip, O', pivoted to the link and coiled around and secured to the bolt, substantially as and for the purpose herein described.

In witness whereof I hereunto set my hand.

J. A. BILZ.

Witnesses:
A. MAYERS,
J. H. BLOOD.